UNITED STATES PATENT OFFICE.

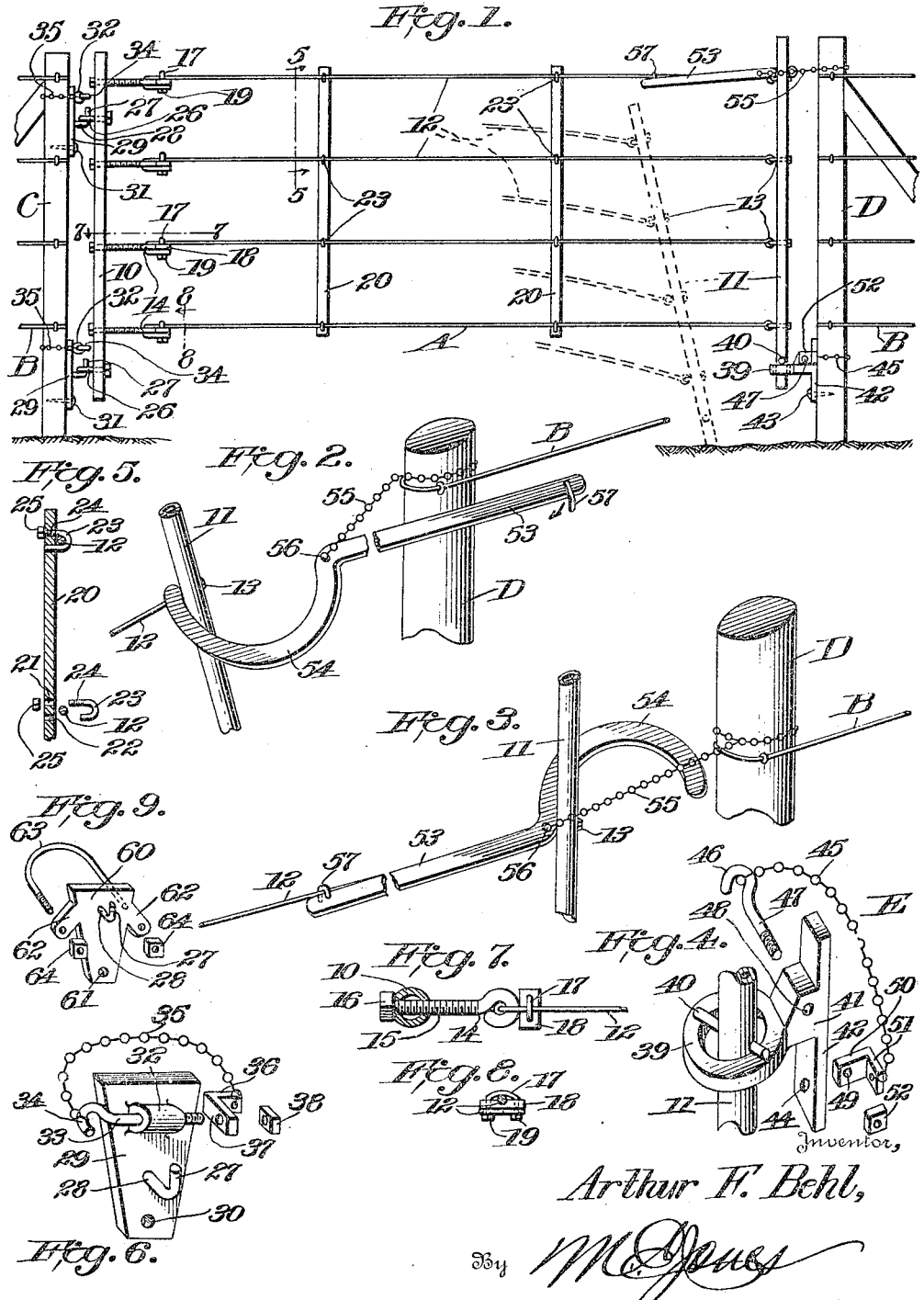

ARTHUR F. BEHL, OF WATERTOWN, WISCONSIN.

FARM-GATE.

1,282,368.      Specification of Letters Patent.      Patented Oct. 22, 1918.

Application filed April 23, 1918. Serial No. 230,270.

*To all whom it may concern:*

Be it known that I, ARTHUR F. BEHL, a citizen of the United States, residing at Watertown, in the county of Jefferson and State of Wisconsin, have invented certain new and useful Improvements in Farm-Gates, of which the following is a specification.

My invention relates to a gate construction particularly adapted for farm use, and to this end, being handy, simple, light in weight, durable and easily adjusted and removed.

Particular objects are to provide a form of gate which is flexible and bendable in combination with means to tension or to tighten it during closing and fastening; to provide such a means as to use the lever mechanism hereinafter specifically described and claimed; to provide a gate which cattle cannot effectively injure and in which the wire or barrier means may be tightened whenever desired to insure proper shape and efficiency; to provide novel mounting means for the gate and for the lever; to provide an effective fastening means for the wire and a means whereby the wire or wires may be tightened, and to generally improve and simplify a gate construction.

With the above and additional objects, which will hereinafter appear, in view, the invention has been embodied in one preferred form as described hereinafter with relation to accompanying drawings wherein:—

Figure 1 is a front elevation of the gate constructed in accordance with my invention, and shown in combination with adjacent structure;

Fig. 2 is a perspective view of the operating and fastening lever, and adjacent parts, showing the lever for manipulation to close and fasten the gate;

Fig. 3 is a perspective view of the same part as Fig. 2 but showing the lever and gate in closed position;

Fig. 4 is a perspective view of the means for supporting and mounting the stile or bar of the gate with which the lever is associated;

Fig. 5 is a view substantially on the line 5—5 of Fig. 1 but showing one of the wire clamps disassembled;

Fig. 6 is a perspective view of the means attached to the post to pivotally mount the gate;

Fig. 7 is a cross sectional view of the line 7—7 of Fig. 1;

Fig. 8 is a cross sectional view on the line 8—8 of Fig. 1, and

Fig. 9 is a disassembled perspective view of a modified form of means attached to the post for pivotally supporting the gate.

Before describing the details, it may be mentioned that the structure to be described is merely one embodiment of the invention and that the details may be modified within a wide range without departing from the spirit and scope of the invention.

The gate is shown at A, adapted to close the space between posts of a fence B, at C and D.

The gate employs vertical end stiles 10 and 11 to which a plurality of wires 12 or other barrier means are connected. These wires are ordinary metallic wires, therefore being flexible or bendable, so that the gate in turn may flex for vertical movement of the stile 11 to permit of fastening and also for the passage of the gate over obstructions. Wires 12 are clenched or otherwise fastened to eyebolts 13 which detachably pass through and are fastened to the stile 11. These wires 12 also pass through the eyelets of bolts 14, having relatively long shanks 15, provided with screw threads, and loosely passing through the stile 10 and beyond the same receiving nuts 16. Nuts 16 may be tightened in order to move the bolt longitudinally of the gate to clench or tighten the wires 12. Suitable means are preferably provided to clamp the wires to the bolts 14 and to this end, the bolts 17 straddle and depend from the wires 12 as best shown in Figs. 7 and 8, passing through plates 18 loosely and beyond them receiving nuts 19 which are threaded to their arms. After the wires pass through the eyelets of the bolts 14, they are bent against the under surface of the plate 18, in any suitable manner, intermediate the same and the nuts 19. Upon tightening the nuts 19, the ends of the wires are tightly clamped to the remainder of the strand.

In order to prevent undue spreading of the wires apart, as by the projection of an animal's head between them, I preferably provide one or more reinforcing bars 20, which have series of openings 21 and 22 therein. U-shaped or hook bolts 23 straddle the wires and the threaded arms 24 of these bolts pass through the openings 21 and beyond the same receive tightening nuts 25, while the other arms of the bolts enter the openings 22 to prevent turning of these bolts or clamps 23. In lieu of these bars and bolts, any suitable means may be employed as is understood.

In order to pivotally mount the gate for lateral swinging movement, eyebolts 26 are detachably clamped to the stile 10. The eyelets of these bolts receive vertical pintles 27 of L-shaped supports 28. Preferably these supports or hooks 28 extend laterally from suitably shaped plates 29 adapted to be secured to the post C as shown in Fig. 1. To this end, openings 30 may be provided in the plates through which nails, screws or other fastening means 31 may pass and penetrate the post. In addition, each plate 29 has a sleeve 32, preferably horizontally disposed and projecting from the plate to adjustably support a bolt 33 having a hook 34 at one end, to which a chain or flexible element 35 is fastened. At the other end, these chains are fastened respectively to arm 36 of L-shaped followers, whose other arms 27 are provided with apertures as shown, through which the bolts 33 extend loosely, and beyond which arms 37, the bolts receive tightening nuts 38. It may thus be seen, that a chain is passed around the post C, the arm 37 is mounted on the threaded shank of the bolt, and the nut applied to this shank in order to tighten the bolt and the chain around the post. This makes a very rigid structure. By way of example, I have shown two of these devices in Fig. 1, to pivot the gate, although it is understood that any number desired may be used.

A suitable supporting plate or bracket E (Fig. 4) is employed for the stile 11. To this end, the bracket may have a ring or plate 39, having an opening through which the stile 11 passes, and which is enlarged relatively to the stile, and on which plate a pin or other rest means 40 carried by the stile 11, may bear. This bracket E is preferably made in one piece and has an enlarged bearing 41 extending from the ring 39 and a tang 42 extending from the bearing. In use, the tang 42 rests flat against the post as shown in Fig. 1 and securing means like a nail or screw 43 is passed through the hole 44 of the tang and driven into the post. In addition, a chain or other flexible element 45 surrounds the post, having one end fixed to a hook 46 of a bolt 47 adapted to have a screwthreaded shank passed loosely through an opening 48 of the bearing 41. Beyond this bearing, said screwthreaded shank extends loosely through an opening 49 of an arm 50 of a follower whose other arm is designated 51 and has the other end of the chain 45 fastened thereto. Beyond the plate 50, the screwthreaded shank of bolt 47 may receive a fastening nut 52. It will be seen, that by means of the bolt, follower and nut, the chain may be tightened into binding engagement with the post, or loosened as desired.

The means used for fastening the gate in closed position, also serves to tension or draw the wires taut. This means utilizes a lever having a relatively long handle 53 which merges into a hook-shaped cam 54, whose receiving space is much larger than the girth of the stile 11. At the junction of the cam and handle, a chain or other flexible element 55 is fastened through an aperture 56, and which point of connection with aperture 56 is at a distance from the post D. The chain 55 also surrounds the post D and its end is suitably fastened to the remainder of the chain in any approved manner. Adjacent the operating end of the lever or handle 53, a hook 57, is provided, which is adapted to hook over the adjacent wire 12 when the gate and the lever and the wires are fastened.

In use, the plates 29 are suitably fastened to the post C and the various parts of the gate are assembled, whereupon the eyelets of the eyebolts 26 receive the pintles 27 and thus mount the gate for lateral swinging movement. The gate is however a flexible structure as described permitting practically a collapse of the gate and especially permitting vertical, lateral and longitudinal movement relatively to the stile 11. The stile 11 therefore when unsupported will rest on the ground and perhaps assume the position suggested by dotted lines in Fig. 1. Stile 11 is detached from the ring 39, and the gate may be freely swung from the pintles 27. In order to close the gate, stile 11 is inserted into the ring 39, and the pin 40 will rest on the ring and the stile will assume an inclined position. The lever 53—54 is then moved to the position of Fig. 2 and the stile 11 brought into engagement with the inner surface of the hook adjacent the free end. The lever is then turned in the direction of the arrow in Fig. 2 to the position shown in Fig. 3, during which action the hook 54 serves as a cam by moving the stile to that portion of the hook 54 opposite to the aperture 56, thus bringing the stile 11 to a vertical position and tightening or tensioning the wires and the gate as an entirety. It will be seen, that the stile 11 is thus disposed between the hook 54 on one side and the chain 55 on the other, and against any possibility of lateral displacement. The lever is fastened in closed position by the hook 57 straddling the top wire 12. To open the gate, the lever may be freely swung or tilted vertically so as to disengage the hook and be moved to the unfastened position in order to release the stile and permit its ready removal from the ring 39.

While I prefer the means shown in Fig. 6 to mount the pintles 27, yet any other approved means may be employed instead. For instance, I may use the form illustrated in Fig. 9. This form employs the pintle 27 as part of the hook 28, the latter being fastened to and extending from a plate 60 provided with an aperture 61 through which a fastening means like 31 may be driven securely to the post C. As well, the plate has lugs 62 extending from its sides and through and beyond which a flexible wire or other member 63, which may surround the post C, may have its free end passed. In order to tighten this member around the post, the ends of its arms are provided with screw threads which receive nuts 64 beyond the lugs.

I claim:—

1. A gate having an open relatively wide fastening member, flexible means mounting said member from a stationary support separate from the gate, said member being adapted to abut a gate part unconnected thereto and being turnable thereon as a fulcrum to dispose said part in the opening of the member with the member on one side and the flexible means on the other side of the part to hold it against displacement.

2. A gate having a fastening lever, means to mount the lever from a stationary support separate from the gate, said lever being unconnected to the gate, and means extending rigidly from the lever and fulcruming directly against the gate to move the gate as the lever is operated.

3. A gate having a frame member movable longitudinally of the gateway, a lever, an elongated flexible element suspending the lever from a stationary support separate from the gate, said lever having a relatively large hook unconnected to the gate and rigidly extending from the lever to receive the frame member, a cam wall on said hook to directly engage the frame member, and said lever being movable in a substantially horizontal plane around said frame member as its fulcrum to move the frame member from one end of the hook toward the other end to tighten the gate and dispose the frame member intermediate the hook and the flexible element against displacement.

4. A gate having a supporting device, said device including a supporting plate, means to secure the device to a post, and said means including a bolt movable transversely of the device, a flexible member extending from said bolt, a follower to which flexible member is connected, said follower being disposed for movement longitudinally of the bolt, and means to secure the follower on the bolt and tighten the flexible member.

5. A gate having a supporting device, said device including a ring, a bearing integral with the ring, a bolt slidable through said bearing, a flexible fastening element secured to the bolt, a follower slidable along the bolt, said flexible element being secured to the follower, and means engageable with the bolt to tighten the follower and the flexible element around a support.

6. A gate having a supporting device, said device having a supporting plate, a flexible element to surround a support, and means mounted by said plate and engageable by said flexible means for tightening thereof around the support.

7. A gate having a supporting device, a plate mounting the device, means extending from the plate to support the gate, means mounted from the plate engageable with a support, said means comprising a bearing on the support, a bolt movable longitudinally of the bearing, a follower movable along the bolt, a flexible element connected to the bolt and to the follower, means to clamp the flexible element and fasten the follower to the bolt.

In testimony whereof, I have affixed my signature in the presence of two witnesses.

ARTHUR F. BEHL.

Witnesses:
 RUDOLPH SCHWELB,
 LOUISE WERBA.